United States Patent
Becker

(10) Patent No.: US 6,691,144 B2
(45) Date of Patent: Feb. 10, 2004

(54) DUAL USE DUAL COMPLEX MULTIPLIER AND COMPLEX DIVIDER

(75) Inventor: Peter E. Becker, Coatesville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/322,160

(22) Filed: Dec. 18, 2002

(65) Prior Publication Data

US 2003/0225809 A1 Dec. 4, 2003

Related U.S. Application Data

(60) Provisional application No. 60/383,686, filed on May 28, 2002.

(51) Int. Cl.[7] .............................................. G06F 7/52
(52) U.S. Cl. .................................... 708/622; 708/650
(58) Field of Search .......................... 708/520, 523, 708/524, 511, 607, 620, 622, 650, 653, 654

(56) References Cited

U.S. PATENT DOCUMENTS

| | | | | |
|---|---|---|---|---|
| 4,354,249 A | * | 10/1982 | King et al. ................. | 708/622 |
| 4,779,218 A | * | 10/1988 | Jauch .......................... | 708/520 |
| 6,411,979 B1 | * | 6/2002 | Greenberger ............... | 708/622 |

* cited by examiner

*Primary Examiner*—Chuong Dinh Ngo
(74) *Attorney, Agent, or Firm*—Volpe and Koenig, PC

(57) ABSTRACT

A circuit performs complex division and dual complex multiplication. The circuit has a plurality of multipliers. Each of the plurality of multipliers is used in both the complex division and the dual complex multiplications. The circuit also has a plurality of components capable of adding and subtracting. Each adding and subtracting component is used during the complex division and the dual complex multiplication and switches between operation as an adder and a subtractor between performing the complex division and the dual complex multiplication. Preferred potential uses for the circuit are in a receiver of a user equipment or a base station. The circuit is used in a fast Fourier transform (FFT) based channel estimation or a FFT based data detection.

10 Claims, 4 Drawing Sheets

DUAL COMPLEX MULTIPLIER/ COMPLEX DIVIDER

DUAL COMPLEX MULTIPLIER/ COMPLEX DIVIDER

DUAL USE DUAL COMPLEX MULTIPLIER AND COMPLEX DIVIDER

This application claims priority to U.S. Provisional Patent Application No. 60/383,686, filed May 28, 2002, which is incorporated by reference as if fully set forth.

BACKGROUND

This invention generally relates to electronic circuits. In particular, the invention relates to performing dual complex multiplication and complex division using a common circuit.

In electronic circuits, many different types of operations need to be performed. Two of the operations that may need to be performed is complex division and complex multiplication. In complex division, one complex number, such as a+jb, is divided by a second complex number, such as c+jd, as per Equation 1.

$$\frac{(a+jb)}{(c+jd)} = \frac{(ac+bd)}{(c^2+d^2)} + j\frac{(bc-ad)}{(c^2+d^2)} \quad \text{Equation 1}$$

In complex multiplication, one complex number, such as a+jb, is multiplied by a second complex number, such as c+jd, as per Equation 2.

$$(a+jb)*(c+jd)=(ac-bd)*j(ad+bc) \quad \text{Equation 2}$$

Complex divisions and multiplications are necessary in many applications. A common application is in communications applications. In these systems, much of the processed information is in complex format requiring complex divisions and multiplications. To illustrate, data is commonly transmitted on an in-phase and quadrature carrier as complex data symbols.

Although complex division and multiplication can be performed by differing circuits, in many applications using two circuits is undesirable. In an integrated circuit environment, two circuits use up valuable silicon space. In a circuit board environment, two circuits require more components as well as requires more circuit board space.

Accordingly, it is desirable to have a circuit which can perform complex division and multiplication.

SUMMARY

A circuit performs complex division and dual complex multiplication. The circuit has a plurality of multipliers. Each of the plurality of multipliers is used in both the complex division and the dual complex multiplications.

BRIEF DESCRIPTION OF THE DRAWING(S)

DETAILED DESCRIPTION OF THE PREFERRED EMBODIMENT(S)

Figure 1:
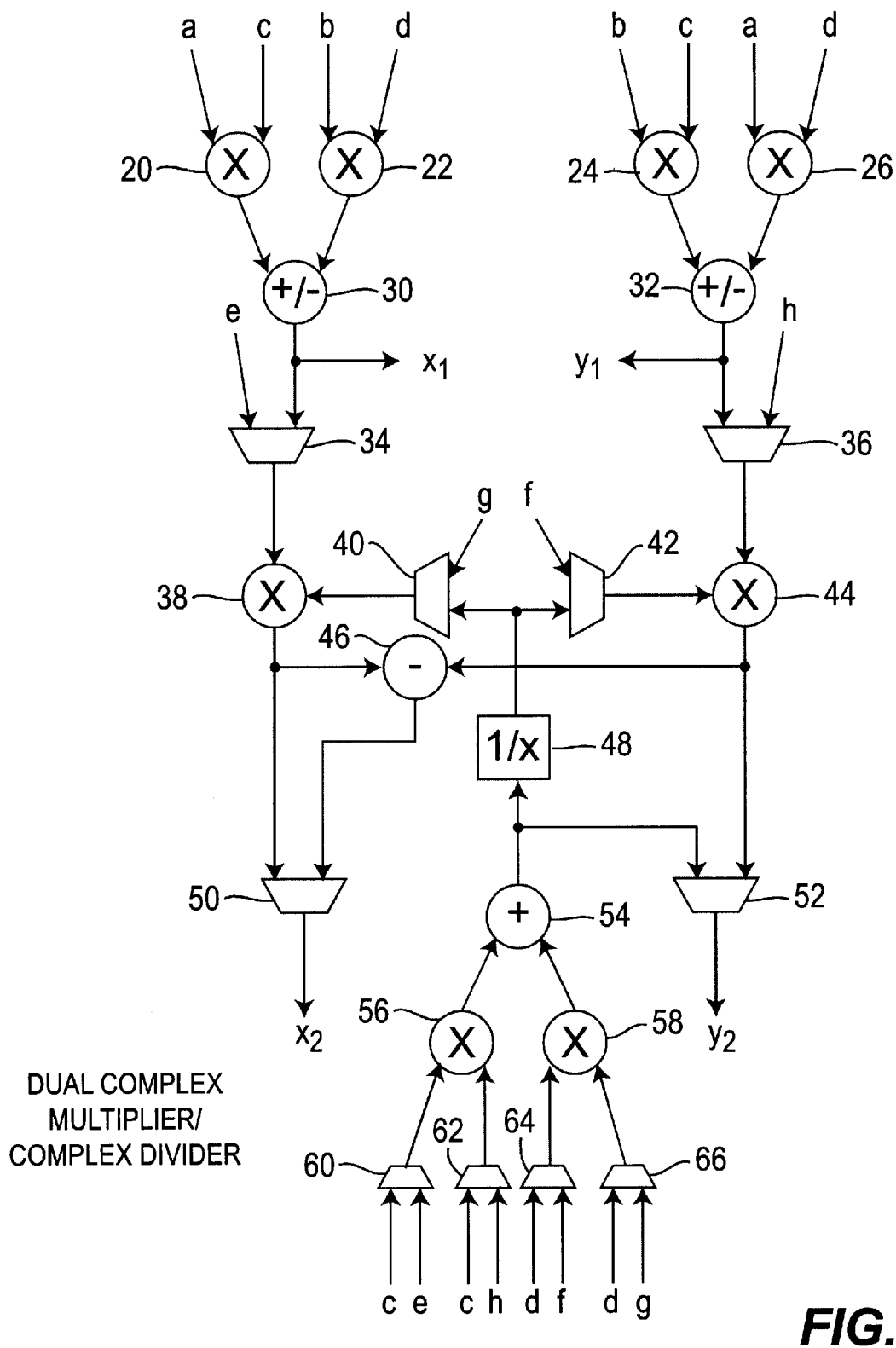
FIG. 1 is an embodiment of circuit capable of performing complex division and dual complex multiplication.

FIG. 1 is an illustration of a preferred embodiment of a circuit for performing both complex division and dual complex multiplication. The input values into the circuit are a, b, c, d, e, f, g, and h. For the complex division, the circuit performs a complex division on values a, b, c and d as per Equation 1.

$$\frac{(a+jb)}{(c+jd)} = \frac{(ac+bd)}{(c^2+d^2)} + j\frac{(bc-ad)}{(c^2+d^2)} \quad \text{Equation 1}$$

The output values, x2 and y2, of the circuit are the results of the complex division as per Equations 3 and 4.

$$x2 = \frac{(ac+bd)}{(c^2+d^2)} \quad \text{Equation 3}$$

$$y2 = \frac{(bc+ad)}{(c^2+d^2)} \quad \text{Equation 4}$$

Accordingly, a result of the complex division is x2+jy2.

For the dual complex multiplications, the circuit performs a multiplication of (a+jb) to (c+jd) and a multiplication of (e+jf) to (g+jd) per Equations 2 and 5.

$$(a+jb)*(c+jd)=(ac-bd)*j(ad+bc) \quad \text{Equation 2}$$

$$(e+jf)*(g+jh)=(eg-fh)*j(eh+fg) \quad \text{Equation 5}$$

The outputs x1 and y1 of the circuit is the result, x1+jy1, of the complex multiplication of (a+jb) to (c+jd) as per Equations 6 and 7.

$$x1=(ac-bd) \quad \text{Equation 6}$$

$$y1=(ad+bc) \quad \text{Equation 7}$$

The outputs x2 and y2 of the circuit is the result, x2+jy2, of the complex multiplication of (e+jf) to (g+jh) as per Equations 8 and 9.

$$x2=(eg-fh) \quad \text{Equation 8}$$

$$y2=(eh+fg) \quad \text{Equation 9}$$

To switch the preferred circuit between operating as a complex divider and a dual complex multiplier, two add/subtract components 30, 32 and ten multiplexers (MUXs) 34, 36, 40, 42, 50, 52, 60, 62, 64, 66 are used.

Figure 2:
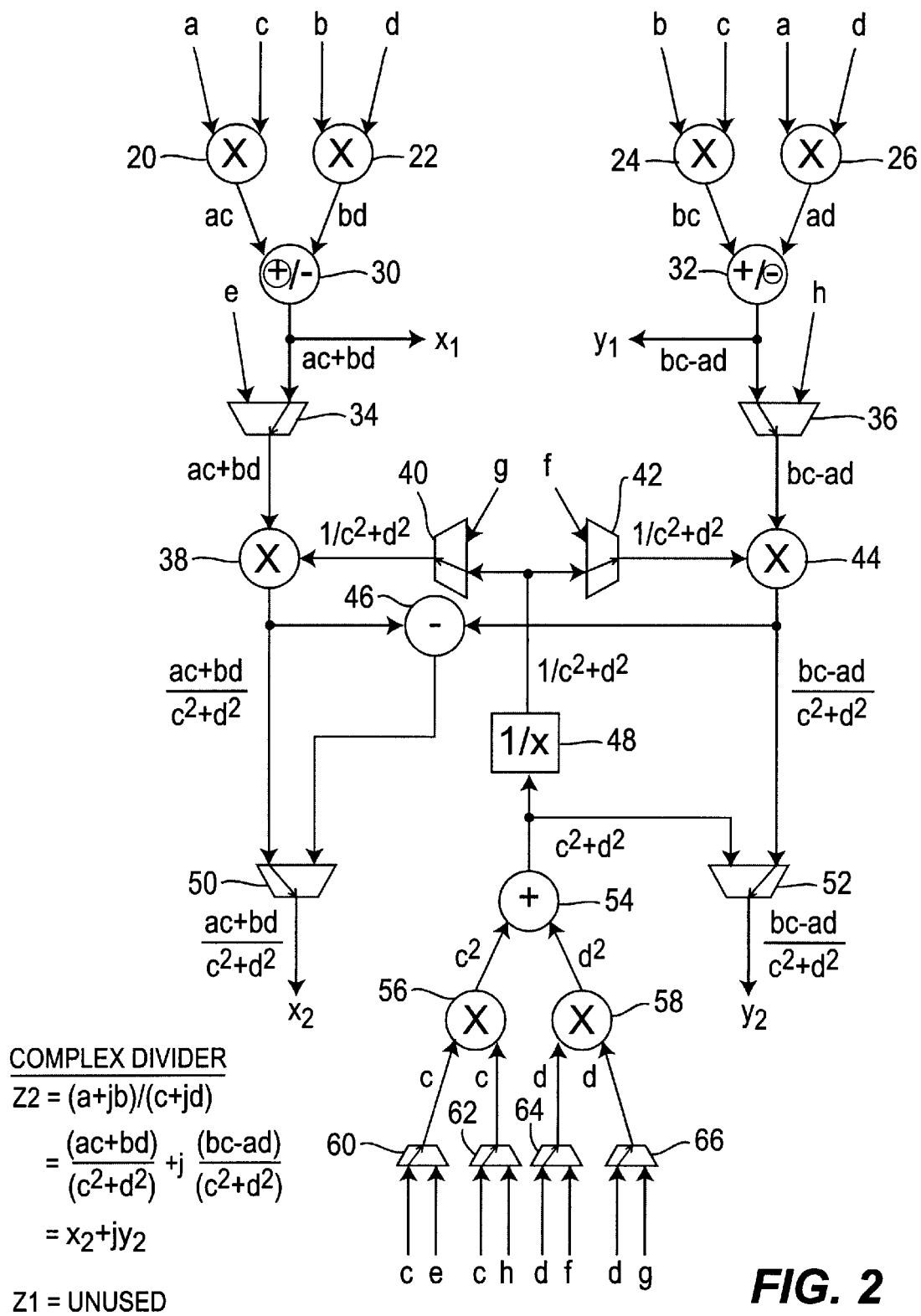
FIG. 2 is an illustration of the complex division processing of the circuit of FIG. 1.

FIG. 2 illustrates the operation of the preferred circuit as a complex divider. While operating as a complex divider, the circuit only needs the input values of a, b, c and d. The values of e, f, h and g do not matter. The four MUXs 60, 62, 64, 66 have inputs to values c, e, c, h, d, f, d, and g from left to right. As shown by a dashed arrow, the left input to each MUX is selected as the output of the MUX. To illustrate, the leftmost MUX 60 selects the c input and outputs c. As a result, the values c, c, d, and d are passed to two multipliers 56, 58. The e, h, f and g inputs to the MUXs are ignored.

The two multipliers 56, 58 multiply their input values together to produce $c^2$ and $d^2$. An adder 54 adds the multiplied results together, $c^2+d^2$. A reciprocal device 48 inverts the added result to produce $1/(c^2+d^2)$. Two MUXs 40, 42, 44 select their bottom inputs, ignoring their top inputs of g and f, and pass the inverted result, $1/(c^2+d^2)$, to respective multipliers 38, 44.

Referring to the upper left of FIG. 2, input values a, c, b and d are input to two multipliers 20, 22. After multiplication, results ac and bd are produced. The add/ subtract component 32 operates as an adder, as shown by the circled "+", and produces ac+bd. Since only the results x2 and y2 are used by the complex divider, the value x1 is not used. A MUX 34 selects the added result, ac+bd to pass to the multiplier 38. The multiplier 38 multiplies the output, ac+bd, of MUX 38 to the output, $1/(c^2+d^2)$, of MUX 40 to produce $(ac+bd)/(c^2+d^2)$. A MUX 50 selects produced $(ac+bd)/(c^2+d^2)$ as the real output of the complex divider x2.

Referring to the upper right of FIG. 2, input values b, c, a and d are input to two multipliers 24, 26. After multiplication, results bc and ad are produced. The add/subtract component 30 operates as a subtractor, as shown by the circled "−", and produces bc−ad. Since only the results x2 and y2 are used by the complex divider, the value y1 is not used. A MUX 36 selects the subtracted result, bc−ad to pass to the multiplier 44. The multiplier 44 multiplies the output, bc−ad, of MUX 36 to the output, $1/(c^2+d^2)$, of MUX 42 to produce $(bc-ad)/(c^2+d^2)$. A MUX 52 selects the produced $(bc-ad)/(c^2+d^2)$ as the imaginary output of the complex divider y2.

Accordingly, the complex divider results, x2 and y2, are determined. The complex divider well utilizes the components of the preferred circuit. The only unused component is subtractor 46.

Figure 3:
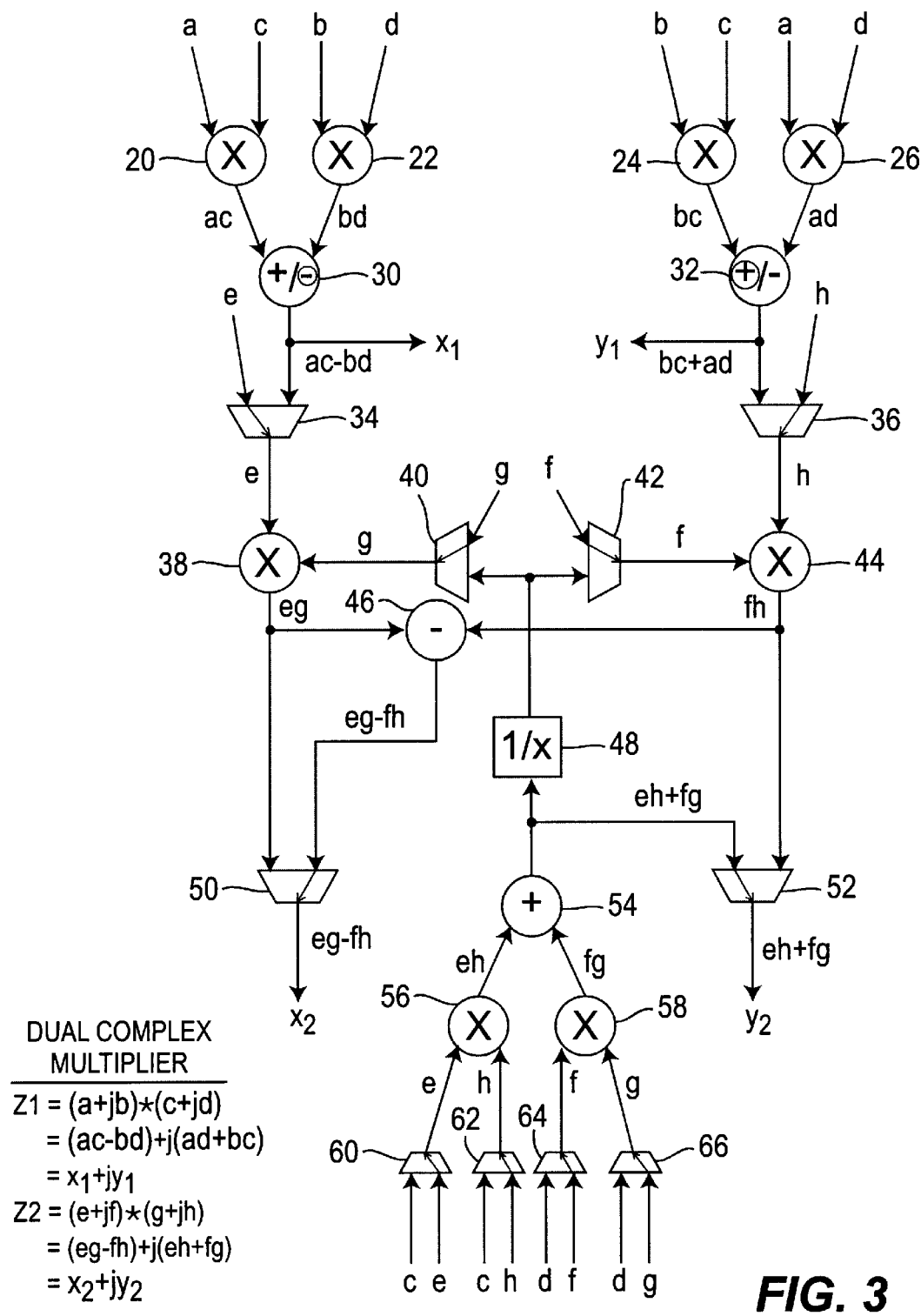
FIG. 3 is an illustration of the dual complex multiplication processing of the circuit of FIG. 1.

FIG. 3 illustrates the operation of the preferred circuit as a dual complex multiplier. While operating as a dual complex multiplier, the circuit uses all eight input values of a, b, c, d, e, f, g and h. Referring to the upper left of FIG. 3, the values a, c, b and d are input into two multipliers 20, 22 to produce ac and bd. The adder/subtractor 30 operates as a subtractor to produce ac−bd. ac−bd is output as the real output x1 of Equation 6.

Referring to the upper right of FIG. 3, the values b, c, a and d are input into two multipliers 24, 26 to produce bc and ad. The adder/subtractor 32 operates as an adder to produce bc+ad. bc+ad is output as the imaginary output y1 of Equation 7.

A MUX 36 selects and outputs value h. A MUX 42 selects and outputs value f. A multiplier 44 takes these outputs and multiplies them to produce fh. fh is input to a subtractor 46. A MUX 34 selects and outputs value e. A MUX 40 selects and outputs value g. A Multiplier 38 takes these outputs and multiplies them to produce eg. eg is input to the subtractor 46. The subtractor subtracts fh from eg to produce eg−fh. A MUX 50 selects eg−fh and outputs that value as the real output x2 of Equation 8.

The four MUXs 60, 62, 64, 66 have inputs to values c, e, c, h, d, f, d, and g from left to right. As shown by a dashed arrow, the right input to each MUX is selected as the output of the MUX. To illustrate, the leftmost MUX 60 selects the e input and outputs e. As a result, the values e, h, f and g are passed to two multipliers 56, 58. The c, c, d and d inputs to the MUXs are ignored.

The two multipliers 56, 58 multiply their input values together to produce eh and fg. An adder 54 adds the multiplied results together to produce eh+fg. A MUX 52 selects eh+fg and outputs that value as the imaginary output y2 of Equation 9.

Accordingly, the dual complex multiplier determines x1, y1, x2 and y2. The dual complex multipliers also well utilizes the components of the preferred circuit. The only unused component is the reciprocal device 48.

Although the dual multiplier is preferably used to process two complex multiplications simultaneously. It can be used to process one complex multiplication by only inputting a, b, c and d and taking only outputs x1 and y1 or only inputting e, f, g and h and taking only outputs x2 and y2.

One implementation of the preferred embodiment is in a receiver of a user equipment or a base station, such as in a time division duplex/code division multiple access, frequency division duplex/code division multiple access or time division synchronous code division multiple access communication system.

Figure 4:
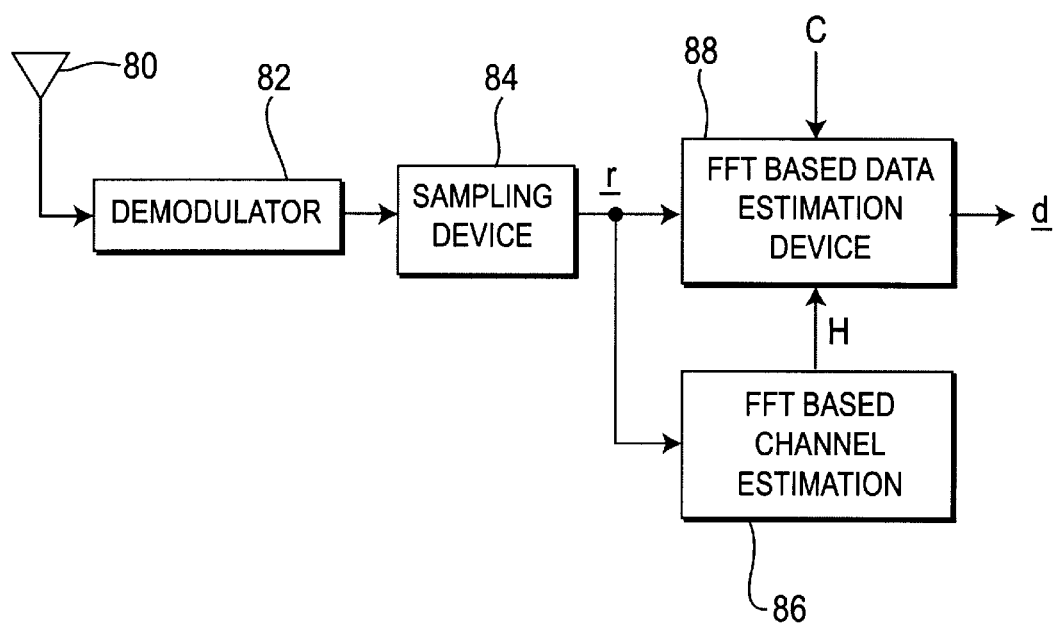
FIG. 4 is a simplified block diagram of a receiver utilizing a dual use dual complex multiplier and complex divider.

FIG. 4 is a simplified block diagram of such a receiver. At the receiver, a signal is received by an antenna 80 or antenna array. The signal has one or more communications transmitted in a code division multiple access format in a shared spectrum. The received signal is demodulated by a demodulator 82 to baseband. The baseband signal is sampled by a sampling device 84 at the chip rate or a multiple of the chip rate of the received signal, to produce a received vector, r. A fast Fourier transform (FFT) based channel estimation device 86 processes the samples to produce channel estimations for each received communication as a channel response matrix, H. The FFT based channel estimation device 86 uses the dual use dual multiplier and divider circuit in the channel estimation.

A FFT based data estimation device uses the received vector, r, code matrix, C, and channel estimation matrix, H, to estimate the received symbols as a data vector, d. For a multiuser detection approach to estimating the data vector, d, Equation 10 is used.

$$r = Ad + n \qquad \text{Equation 10}$$

A is the channel response matrix. A is constructed by convolving a line from the H matrix with one or multiple lines from the C matrix.

Two approaches to solve Equation 10 are a zero forcing solution per Equation 11 or a minimum mean square error solution per Equation 12.

$$d = (A^H A)^{-1} A^H r \text{ or}$$

$$d = R^{-1} A^H r, \text{ where } R = A^H A \qquad \text{Equation 11}$$

$$d = (A^H A + \sigma^2 I)^{-1} A^H r \text{ or}$$

$$d = R^{-1} A^H r, \text{ where } R = A^H A + \sigma^2 I \qquad \text{Equation 12}$$

$\sigma^2$ is the variance of the noise, n. I is the identity matrix and $(\cdot)^H$ indicates the conjugate transpose operation.

For a single user detection approach to estimating the data vector, d, Equation 13 is used.

$$r = H s + n \qquad \text{Equation 13}$$

s is the spread symbol vector per Equation 14.

s is the spread symbol vector per Equation 14.

$$s = C \cdot d \qquad \text{Equation 14}$$

Two approaches to solve Equation 13 are a zero forcing solution per Equation 15 or a minimum mean square error solution per Equation 16.

$$s = (H^H H)^{-1} H^H r \text{ or}$$

$$s = R^{-1} H^H r, \text{ where } R = H^H H \qquad \text{Equation 15}$$

$$d = (H^H H + \sigma^2 I)^{-1} + H^H r \text{ or}$$

$$d = R^{-1} + H^H r, \text{ where } R = H^H H + \sigma^2 I \qquad \text{Equation 16}$$

Using a circulant approximation for R, the data detection can be perform using FFTs for either multiuser detection or single user detection. In the FFT based solutions, the dual use dual multiplier and divider circuit is utilized to estimate the data vector, d.

What is claimed is:

1. A circuit capable of performing complex division and dual complex multiplications, the circuit comprising:
   a plurality of multipliers, each of the plurality of multipliers is used in both the complex division and the dual complex multiplications;
   a plurality of multiplexers for selecting an input in response to performing the complex division or the dual complex multiplication;
   a reciprocal device coupled to at least one multiplexer for taking a reciprocal of an input value; and
   a plurality of components capable of adding, subtracting and both adding and subtracting, each both adding and subtracting component is used during the complex division and the dual complex multiplications.

2. The circuit of claim 1 wherein each of the both adding and subtracting components switches between operation as an adder and a subtractor between performing the complex division and the dual complex multiplications.

3. A user equipment comprising:
   a channel estimation device having an input configured to received samples of a signal including a plurality of communications and for producing channel estimates for the communications using a fast Fourier transform based approach, the channel estimation device utilizing circuit capable of performing complex division and dual complex multiplications in the fast Fourier based approach, the circuit comprising:
      a plurality of multipliers, each of the plurality of multipliers is used in both the complex division and the dual complex multiplications;
      a plurality of multiplexers for selecting an input in response to performing the complex division or the dual complex multiplication;
      a reciprocal device coupled to at least one multiplexer for taking a reciprocal of an input value; and
      a plurality of components capable of adding, subtracting and both adding and subtracting, each both adding and subtracting component is used during the complex division and the dual complex multiplications.

4. The user equipment of claim 3 wherein each of the adding and subtracting components switches between operation as an adder and a subtractor between performing the complex division and the dual complex multiplications.

5. A base station comprising:
   a channel estimation device having an input configured to received samples of a signal including a plurality of communications and for producing channel estimates for the communications using a fast Fourier transform based approach, the channel estimation device utilizing circuit capable of performing complex division and dual complex multiplications in the fast Fourier based approach, the circuit comprising:
      a plurality of multipliers, each of the plurality of multipliers is used in both the complex division and the dual complex multiplications;
      a plurality of multiplexers for selecting an input in response to performing the complex division or the dual complex multiplication;
      a reciprocal device coupled to at least one multiplexer for taking a reciprocal of an input value; and
      a plurality of components capable of adding, subtracting and both adding and subtracting, each both adding and subtracting component is used during the complex division and the dual complex multiplications.

6. The base station of claim 5 wherein each of the adding and subtracting components switches between operation as an adder and a subtractor between performing the complex division and the dual complex multiplications.

7. A user equipment comprising:
   a data detection device having an input configured to received samples of a signal including a plurality of communications, a code vector and channel estimates of the communications, the data detection device for estimating data of the communications using a fast Fourier transform based approach, the data detection device utilizing a circuit capable of performing complex division and dual complex multiplications in the fast Fourier based approach, the circuit comprising:
      a plurality of multipliers, each of the plurality of multipliers is used in both the complex division and the dual complex multiplications;
      a plurality of multiplexers for selecting an input in response to performing the complex division or the dual complex multiplication;
      a reciprocal device coupled to at least one multiplexer for taking a reciprocal of an input value; and
      a plurality of components capable of adding, subtracting and both adding and subtracting, each both adding and subtracting component is used during the complex division and the dual complex multiplications.

8. The user equipment of claim 7 wherein each of the adding and subtracting components switches between operation as an adder and a subtractor between performing the complex division and the dual complex multiplications.

9. A base station comprising:
   a data detection device having an input configured to received samples of a signal including a plurality of communications, a code vector and channel estimates of the communications, the data detection device for estimating data of the communications using a fast Fourier transform based approach, the data detection device utilizing a circuit capable of performing complex division and dual complex multiplications in the fast Fourier based approach, the circuit comprising:
      a plurality of multipliers, each of the plurality of multipliers is used in both the complex division and the dual complex multiplications;
      a plurality of multiplexers for selecting an input in response to performing the complex division or the dual complex multiplication;
      a reciprocal device coupled to at least one multiplexer for taking a reciprocal of an input value; and
      a plurality of components capable of adding, subtracting and both adding and subtracting, each both adding and subtracting component is used during the complex division and the dual complex multiplications.

10. The base station of claim 9 wherein each of the adding and subtracting components switches between operation as an adder and a subtractor between performing the complex division and the dual complex multiplications.

* * * * *

UNITED STATES PATENT AND TRADEMARK OFFICE
CERTIFICATE OF CORRECTION

PATENT NO. : 6,691,144 B2
DATED : February 10, 2004
INVENTOR(S) : Peter E. Becker It is certified that error appears in the above-identified patent and that said Letters Patent is hereby corrected as shown below:

Column 2,
Equation 4, line 17, delete "$y2 = \frac{(bc + ad)}{(c^2 + d^2)}$" and insert therefore -- $y2 = \frac{(bc - ad)}{(c^2 + d^2)}$ --.

Column 4,
Equation 10, line 27, delete "$r = Ad + n$" and insert therefore -- $\underline{r} = A\underline{d} + \underline{n}$ --.
Equation 11, line 35, delete "$d = (A^H A)^{-1} A^H r$" and insert therefore -- $\underline{d} = (A^H A)^{-1} A^H \underline{r}$ --.
Equation 11, line 37, delete "$d = R^{-1} A^H r$" and insert therefore -- $\underline{d} = R^{-1} A^H \underline{r}$ --.
Equation 12, line 38, delete "$d = (A^H A + \sigma^2 I)^{-1} A^H r$" and insert therefore
-- $\underline{d} = (A^H A + \sigma^2 I)^{-1} A^H \underline{r}$ --.
Equation 12, line 40, delete "$d = R^{-1} A^H r$" and insert therefore -- $\underline{d} = R^{-1} A^H \underline{r}$ --.
Line 42, after the word "noise", delete "n" and insert therefore -- $\underline{n}$ --.
Line 43, delete "$(\cdot)^H$" and insert therefore -- $(.)^H$ --.
Equation 13, line 47, delete "$r = Hs + n$" and insert therefore -- $\underline{r} = H\underline{s} + \underline{n}$ --.
Lines 48 and 49, before the word "is", delete "s" and insert therefore -- $\underline{s}$ --.
Equation 14, line 52, delete "$s = C \cdot d$" and insert therefore -- $\underline{s} = C \cdot \underline{d}$ --.
Equation 15, line 57, delete "$s = (H^H H)^{-1} H^H r$" and insert therefore -- $\underline{s} = (H^H H)^{-1} H^H \underline{r}$ --.
Equation 15, line 59, delete "$s = R^{-1} H^H r$" and insert therefore -- $\underline{s} = R^{-1} H^H \underline{r}$ --.
Equation 16, line 60, delete "$d = (H^H H + \sigma^2 I)^{-1} + H^H r$" and insert therefore
-- $\underline{d} = (H^H H + \sigma^2 I)^{-1} + H^H \underline{r}$ --.
Equation 16, line 62, delete "$d = R^{-1} + H^H r$" and insert therefore -- $\underline{d} = R^{-1} + H^H \underline{r}$ --.
Line 67, after the word "vector", delete "d" and insert therefore -- $\underline{d}$ --.

Signed and Sealed this

Twenty-eighth Day of June, 2005

JON W. DUDAS
*Director of the United States Patent and Trademark Office*